US010169404B2

(12) United States Patent
Bester et al.

(10) Patent No.: US 10,169,404 B2
(45) Date of Patent: Jan. 1, 2019

(54) AUTOMATICALLY AGGREGATING DATA IN DATABASE TABLES

(71) Applicant: INTERNATIONAL BUSINESS MACHINES CORPORATION, Armonk, NY (US)

(72) Inventors: Karla Bester, Ridgewood (AU); Allan T. Chandler, Floreat (AU); Mark A. Shewell, Perth (AU); Stephen J. Yates, Beaconsfield (AU)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 14/538,258

(22) Filed: Nov. 11, 2014

(65) Prior Publication Data

US 2016/0132543 A1 May 12, 2016

(51) Int. Cl.
*G06F 17/30* (2006.01)

(52) U.S. Cl.
CPC .. *G06F 17/30383* (2013.01); *G06F 17/30498* (2013.01)

(58) Field of Classification Search
CPC ......... G06F 17/30554; G06F 17/30327; G06F 17/30386; G06F 17/30489
USPC ........ 707/737, 722, 769, E17.044, 600, 601, 707/692, 714, 758, 766, E17.002, 707/E17.007, E17.011, E17.014, E17.017, 707/E17.046, E17.056, E17.124, E17.131, 707/604, 606, 607, 608, 693, 694, 700, 707/704, 713, 723, 725, 740, 751, 770, 707/802, 810, 812; 709/224, 201, 204, 709/206, 223, 226
See application file for complete search history.

(56) References Cited

U.S. PATENT DOCUMENTS

| 6,401,089 | B2 * | 6/2002 | Isip, Jr. ............... G06F 17/3051 |
| 6,421,658 | B1 * | 7/2002 | Carey ............... G06F 17/30595 |
| 7,349,910 | B2 * | 3/2008 | Chen ................. G06F 17/30377 |
| 7,596,520 | B2 | 9/2009 | Kahn et al. |
| 8,549,019 | B2 | 10/2013 | Nandy et al. |

(Continued)

FOREIGN PATENT DOCUMENTS

EP 1164509 A2 12/2001

OTHER PUBLICATIONS

Iftikhar, N. and Pedersen, T. "A Rule-based Tool for Gradual Granular Data Aggregation". DOLAP 2011. Glasgow, Scotland. Copyright 2011.

(Continued)

*Primary Examiner* — Jay A Morrison
*Assistant Examiner* — Ken Hoang
(74) *Attorney, Agent, or Firm* — John W. Hayes; William H. Hartwell (57) ABSTRACT

A method for aggregating data in database tables. A computer receives a request to create an aggregation object comprising a set of related tables and aggregation rules. The computer system creates an aggregation object comprising multiple tables with related key and data columns and managed as a single entity with a single definition. Upon receiving data in the form of a new, inserted, or updated row, the computer system automatically aggregates the data to all objects in the aggregation object hierarchy by creating a summarized row for the current table using the inserted, merged or updated row and defined aggregation rules for each object.

18 Claims, 6 Drawing Sheets

(56) References Cited

U.S. PATENT DOCUMENTS

| | | | | |
|---|---|---|---|---|
| 2006/0007464 A1* | 1/2006 | Percey | ................ | G06F 17/2247 |
| | | | | 358/1.13 |
| 2007/0150520 A1* | 6/2007 | Bennett | ................ | G06Q 10/06 |
| 2009/0276449 A1* | 11/2009 | Syed | ................ | G06F 17/30442 |
| 2012/0323937 A1* | 12/2012 | Modi | ................ | G06F 17/3038 |
| | | | | 707/754 |
| 2012/0330996 A1* | 12/2012 | Chang | ............... | G06F 17/30551 |
| | | | | 707/769 |

OTHER PUBLICATIONS

Uppalapati, K. "Oracle BI Solutions: Creating and Modeling Aggregate Tables in OBIEE11g". Dec. 28, 2012. <http://oraclebisolutions.blogspot.in/2012/12/creating-and-modeling-aggregate-tables.html>.

* cited by examiner

AUTOMATICALLY AGGREGATING DATA IN DATABASE TABLES

FIELD OF THE INVENTION

The present invention relates generally to the field of data aggregation, and more particularly to data aggregation in database tables.

BACKGROUND OF THE INVENTION

A relational database is a database that stores information about data and how it is related in a flat two-dimensional table called a relation. For example, organizations often want to store and retrieve information about people, where they are located, and how to contact them. However, people often live or work at a variety of addresses, so recording and retrieving their addresses becomes important. Relational databases are ideal for supporting these kinds of applications. A Relational Database Management System (RDBMS) is software used to control reading, writing, modifying, and processing the information stored in the databases. The data are formally described and organized according to each database's relational model or database schema, according to the design.

A traditional relational database management system stores data in tables with the tables containing rows and columns of data. Certain columns are often designated as "key" columns, allowing rapid access to data via an index built based on the key. Certain types of key columns, such as dates and timestamps, lend themselves naturally to aggregation of data from a table containing a highly granular view for recent data, to a table containing a less granular view for older data. Software applications can use data manipulation instructions, such as the Structured Query Language (SQL), and built-in database functions such as triggers, to aggregate data through the implied hierarchy of tables from most granular to least granular.

Maintaining such a hierarchy has traditionally been accomplished by writing application code that uses application language constructs, or exploits database features such as "merge". An RDBMS uses SQL MERGE, also known as upsert statements, to INSERT new records or UPDATE existing records depending on whether or not a condition matches. Another method is exploiting features of the database implementation that allow the hierarchy to be maintained automatically, e.g., by using "triggers". A database trigger is procedural code that automatically executes in response to certain events on a particular table or view in a database. The trigger is mostly used for maintaining the integrity of the information in the database. When a new record, representing a new teacher for example, is added to an employee table, new records should also be created in the tables for taxes, vacations and salaries.

SUMMARY

Embodiments in accordance with the present invention disclose a method, computer program product, and system for automatically aggregating data in database tables. In an embodiment, a computer receives a request to create an aggregation object comprising a set of related tables and aggregation rules. The computer system creates an aggregation object comprising multiple tables with related key and data columns and managed as a single entity with a single definition. Upon receiving data in the form of a new, inserted, or updated row, the computer system automatically aggregates the data to all objects in the aggregation object hierarchy by creating a summarized row for the current table using the inserted, merged or updated row and defined aggregation rules for each object.

DETAILED DESCRIPTION

Embodiments in accordance with the present invention recognize that data in relational databases are sometimes required to be propagated to additional tables with varying granular views of the data. The concept of an aggregation group, comprised of a set of related database tables and aggregation rules that are managed as a single entity with a single definition, is an effective solution to this problem. Using an aggregation group results in the aggregation objects being intrinsically consistent because they are drawn from a single definition. The aggregation group objects are also easier to maintain, being less complicated than alternative Structured Query Language (SQL) based implementations, and optimized within the relational database software or underlying hardware.

In some embodiments, database functions such as SELECT, INSERT, UPDATE, etc., may be executed against the aggregation object or one of the component objects. This execution of database functions suggests that actions against component objects could be defined to be either aggregating (in which normal aggregation to other parts of the aggregation object would occur), or non-aggregating (that is, the action would only affect the specific target object, such as correcting an error). In another embodiment, an implementation may provide the ability to break an aggregation object up into its component tables, i.e., the aggregation object and associated automatic processes, as such, would no longer exist, but the component tables would be retained. In another embodiment, an implementation may provide the ability to alter the aggregation objects. In other embodiments, an implementation may provide the ability to drop columns going up the hierarchy, e.g., an hourly aggregation table at the bottom of a hierarchy would require a time column, but a monthly aggregation table further up the hierarchy would not.

Figure 1:
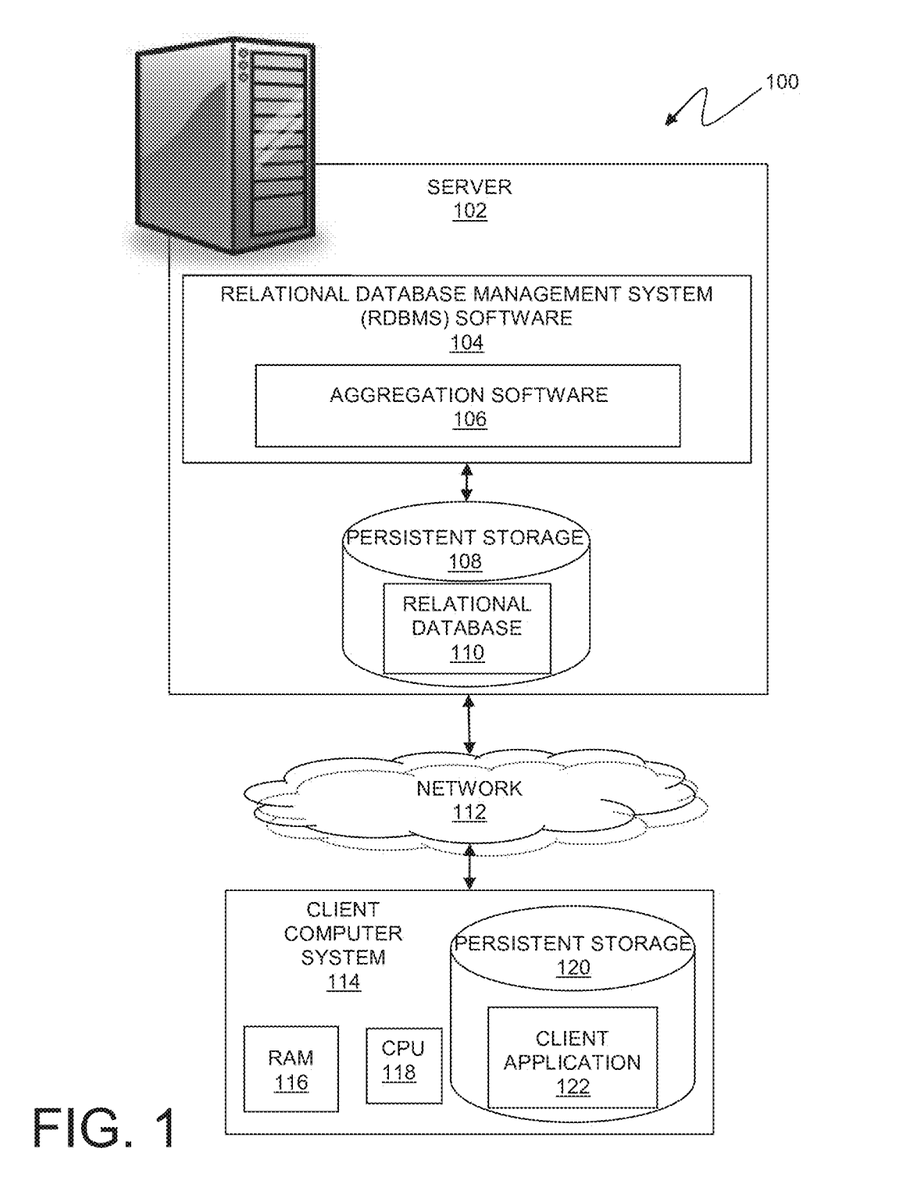
FIG. 1 is a functional block diagram illustrating a relational database processing environment, in an embodiment in accordance with the present invention.

Embodiments in accordance with the present invention will now be described in detail with reference to the Figures. FIG. 1 is a functional block diagram illustrating a relational database processing environment, generally designated 100, in an embodiment in accordance with the present invention. Server 102 may be a desktop computer, laptop computer, a specialized computer server, a client computer, or any other computer system known in the art. In certain embodiments, server 102 may represent a computer system utilizing clustered computers and components to act as a single pool of seamless resources when accessed through a network, as is common in data centers and with distributed computing applications. In general, server 102 is representative of any programmable electronic device or combination of programmable electronic devices capable of executing machine-readable program instructions. Components of server 102 are described in greater detail with regard to FIG. 6.

In FIG. 1, network 112 is shown as the interconnecting fabric between server 102 and client computer system 114. In practice, the connection may be any viable data transport network, such as, for example, a LAN or WAN. Network 112 can be, for example, a local area network (LAN), a wide area network (WAN) such as the Internet, or a combination of the two, and include wired, wireless, or fiber optic connections. In general, network 112 can be any combination of connections and protocols that will support communications between server 102 and client computer system 114.

Client computer system 114 also contains RAM 116, a central processing unit 118, and persistent storage 120 such as a hard disk drive. Client application 122, that is stored in persistent storage 120, includes operating system software as well as software that enables client computer system 114 to communicate with server 102, RDBMS software 104, and aggregation software 106 over a data connection on network 112. Client computer system 114 may be a laptop computer, tablet computer, netbook computer, personal computer (PC), a desktop computer, a personal digital assistant (PDA), a smart phone, or any programmable electronic device capable of communicating with server 102 via network 112. In certain embodiments, server 102 represents a computer system utilizing clustered computers and components that act as a single pool of seamless resources when accessed through network 112, as is common in data centers and with cloud computing applications.

Relational database management system (RDBMS) software 104 resides on server 102 and allows for accessing, storing, updating, and deleting data in relational database 110. RDBMS software 104 may display one or more tables, or portions of one or more tables, and may receive user input through a user interface or remote application, such as client application 122, on client computer system 114 over network 112. Aggregation software 106 is a subprogram or functions of RDBMS software 104 that provides the ability to define an aggregation object comprising a set of tables with related key and data columns. Aggregation software 106 also provides the ability to automatically aggregate data in an aggregation object hierarchy when data is added to a table in the hierarchy.

Figure 2:
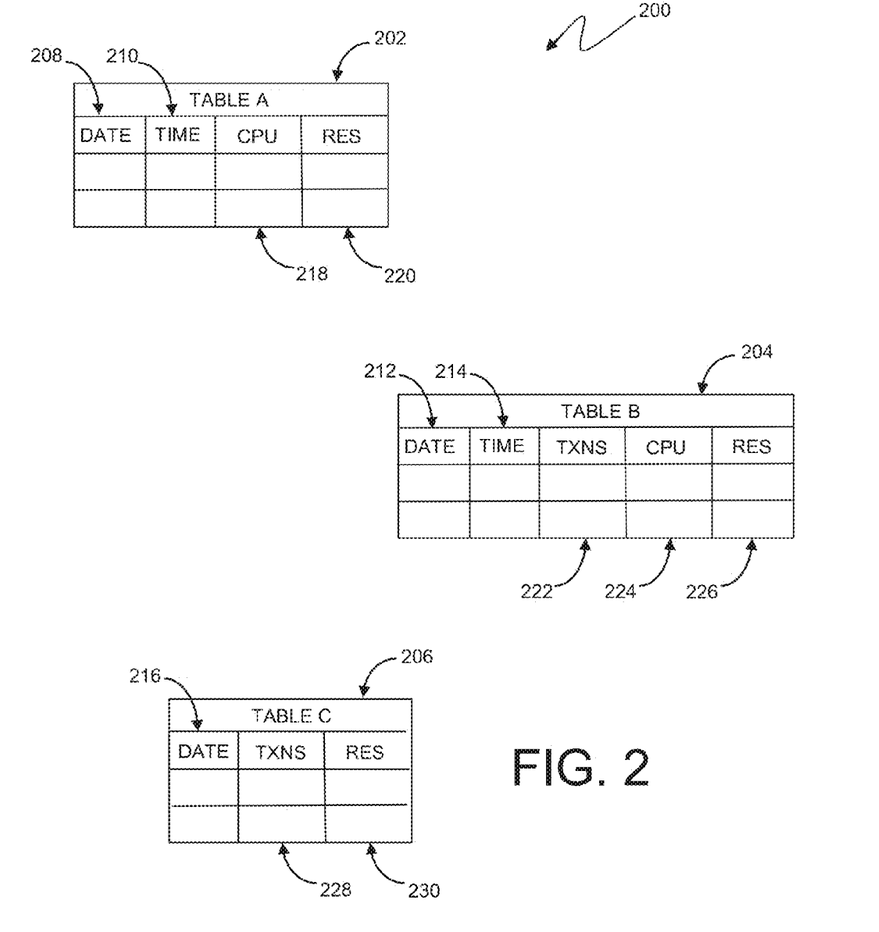
FIG. 2 is a representation of an aggregation object hierarchy, consisting of one or more tables in a relational database, in an embodiment in accordance with the present invention.

FIG. 2 is a representation of an aggregation object hierarchy, consisting of one or more tables in a relational database, in an embodiment in accordance with the present invention. Aggregation object hierarchy 200 consists of table A 202, table B 204, and table C 206. Table A 202 in aggregation object hierarchy 200 contains key columns 208 and 210 to store date and time values. Table A 202 also contains data columns 218 and 220 which store central processing unit (CPU) and transaction response times. In one embodiment, aggregation object hierarchy 200 may include predefined tables that are assigned or grouped together to form the aggregation group. In another embodiment, the aggregation object hierarchy 200 may consist of one or more tables that are created at the same time that the aggregation group hierarchy is created.

Table B 204 in aggregation object hierarchy 200 contains key columns 212 and 214 to store date and time values as well as data columns 222, 224 and 226 which store transactions executed, CPU response time and transaction response times. Table C in aggregation object hierarchy 200 contains key column 216 to store date values as well as data columns 228 and 230 which store transactions executed and transaction response times. The number of key columns may vary between tables in some embodiments. Tables in the aggregation object hierarchy will have at least one key column in common.

Figure 3:
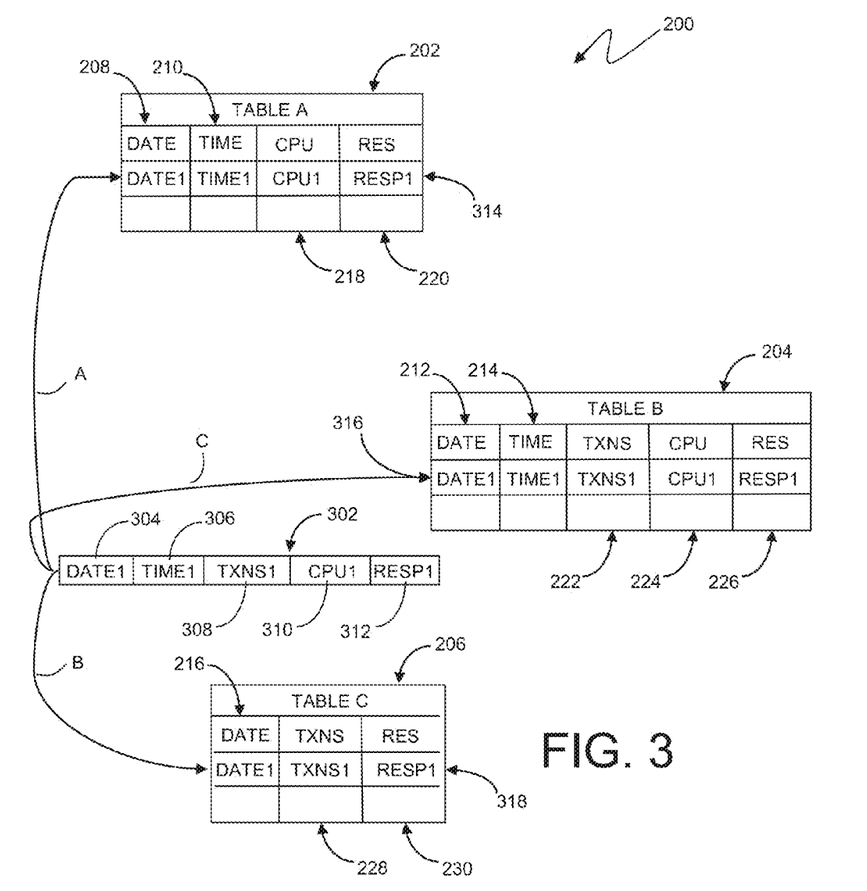
FIG. 3 depicts a summarized row being added to the aggregation object hierarchy as a result of an aggregation operation, in an embodiment in accordance with the present invention.

FIG. 3 depicts a summarized row being added to the aggregation object hierarchy as a result of an aggregation operation, in an embodiment in accordance with the present invention. Summarized row 302 is created by aggregation software 106 to be inserted to the aggregation object hierarchy 200. Summarized row 302 contains key columns 304 and 306 to store date and time values. Summarized row 302 also contains data columns 308, 310, and 312 which store central processing unit (CPU) response time and transaction response times. Aggregation software finds the first table in the aggregation object hierarchy, table A 202, and inserts summarized row 302 in the table using the defined rules for table A 202 as indicated by row insert indicator A. The transactions executed 308 column is dropped for table A 202. Date and time key columns 304 and 306, along with central processing unit (CPU) response time 310 and transaction response times 312 are inserted as depicted in inserted row 314. The defined rules for table A may vary for each column. The time may be rounded to the hour for time column 210. The CPU column 218 may be the sum of CPU times used by the transactions executed during the hour. The transaction response times 220 column may be an average of the transaction response times computed over the set of transactions executed.

Aggregation software 106 then inserts summarized row 302 into table B 204 as indicated by inserted row 316 and row insert indicator B. Table B 204 contains all the key and data columns of summarized row 302, however, the defined column rules for table B 204 may vary from the column rules of table A 202. Aggregation software 106 also inserts summarized row 302 in table C 206 as depicted by row insert indicator C. The time column 306 and CPU response time column 310 are dropped from summarized row 302 as part of the defined column rules, as indicated by inserted row 318. In other embodiments, the defined table rules may be visible to the user as part of the column label or by moving the pointer device to the column label. In other embodiments, the defined column rules are only visible at the aggregation creation time, or by editing the aggregation table properties.

Figure 4:
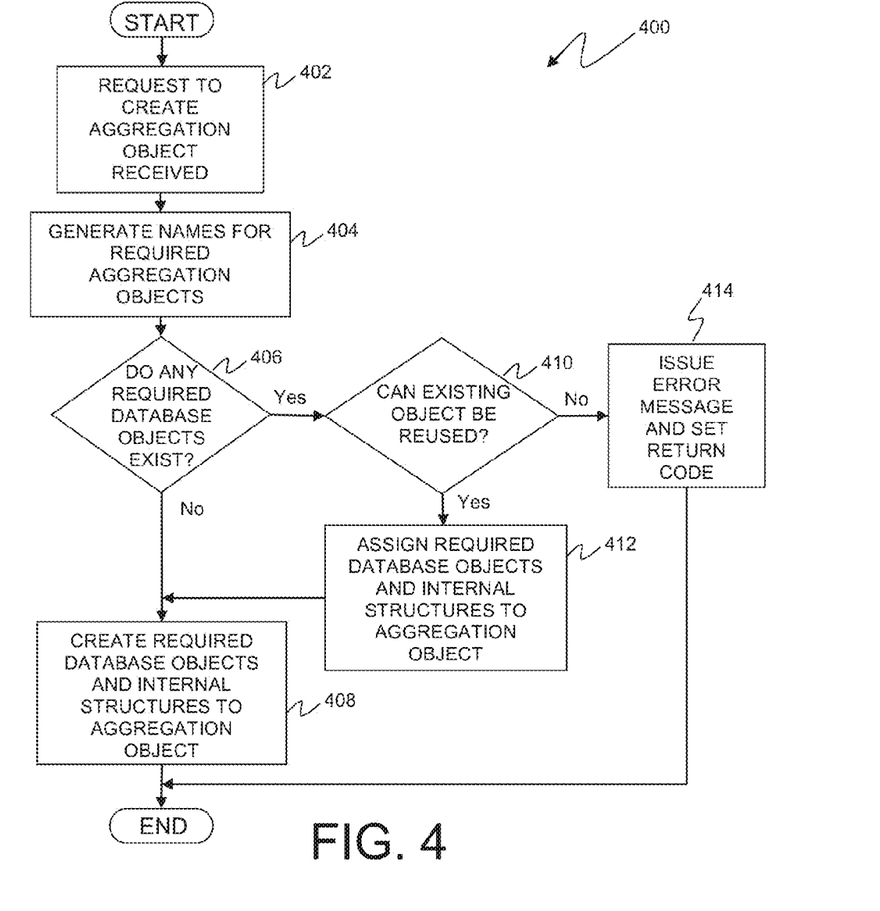
FIG. 4 is a flowchart illustrating operational steps for creating an aggregation object comprising a set of tables with related key and data columns, in an embodiment in accordance with the present invention.

FIG. 4 is a flowchart, generally depicted by the numeral 400, illustrating operational steps for creating an aggregation object comprising a set of tables with related key and data columns, in an embodiment in accordance with the present invention. RDBMS software 104 and aggregation software 106 receive a request to create an aggregation object consisting of one or more tables with related key and data columns as depicted in step 402. In step 404, aggregation software 106 generates the names or labels of the required tables for the aggregation object. The names or labels may be generated by RDBMS software 104 or aggregation software 106 or determined by the user issuing the aggregation object creation request. In one embodiment, the request may come from a remote computer such as client computer system 114. In another embodiment, the request may be received from user input at server 102 directly. Exemplary components of server 102 are described in greater detail with regard to FIG. 6.

Aggregation software 106 then determines if any of the required database objects exist in relational database 110 as indicated in decision 406. If the required database objects do not exist in relational database 110, ("no" branch, decision 406), aggregation software 106 creates the database objects and internal structures required for the aggregation hierarchy and stores them in relational database 110 as depicted in step 408. If the required database objects do exist in relational database 110, ("yes" branch, decision 406), aggregation software 106 determines if the existing database objects can be reused as indicated in decision 410. In another embodiment, existing database objects may or may not cause an error condition for aggregation software 106.

If the existing database objects in relational database 110 cannot be reused, ("no" branch, decision 410), aggregation software 106 generates the appropriate error message for the failure event that is presented to the user as depicted in step 414. In one embodiment, the error message is generated and displayed to the user by aggregation software 106. In another embodiment, the error message is generated by the RDBMS software 104 or other software programs such as client application 122 and displayed to the user. In other embodiments, the error message is generated and displayed by the operating system of server 102 or client computer system 114. If the existing database objects in relational database 110 can be reused, ("yes" branch, decision 410), aggregation software 106 assigns the database objects and internal structures required to the aggregation object as depicted in step 412.

The internal structure may vary depending on the implementation. For example, a Database 2 (DB2) implementation may be implemented as entries in existing and/or new catalog tables where each table in the aggregation hierarchy contains an indication of the next or higher table in the object. The DB2 implementation would also contain a rule for the next or higher table in the object indicating how that column should be derived from the corresponding column in the source table, i.e., it may be the maximum or the sum. And finally, a rule or set of rules indicating how the key columns of the next "higher" table are derived. In step 408, aggregation software 106 creates the database objects and internal structures required for the aggregation hierarchy.

Figure 5:
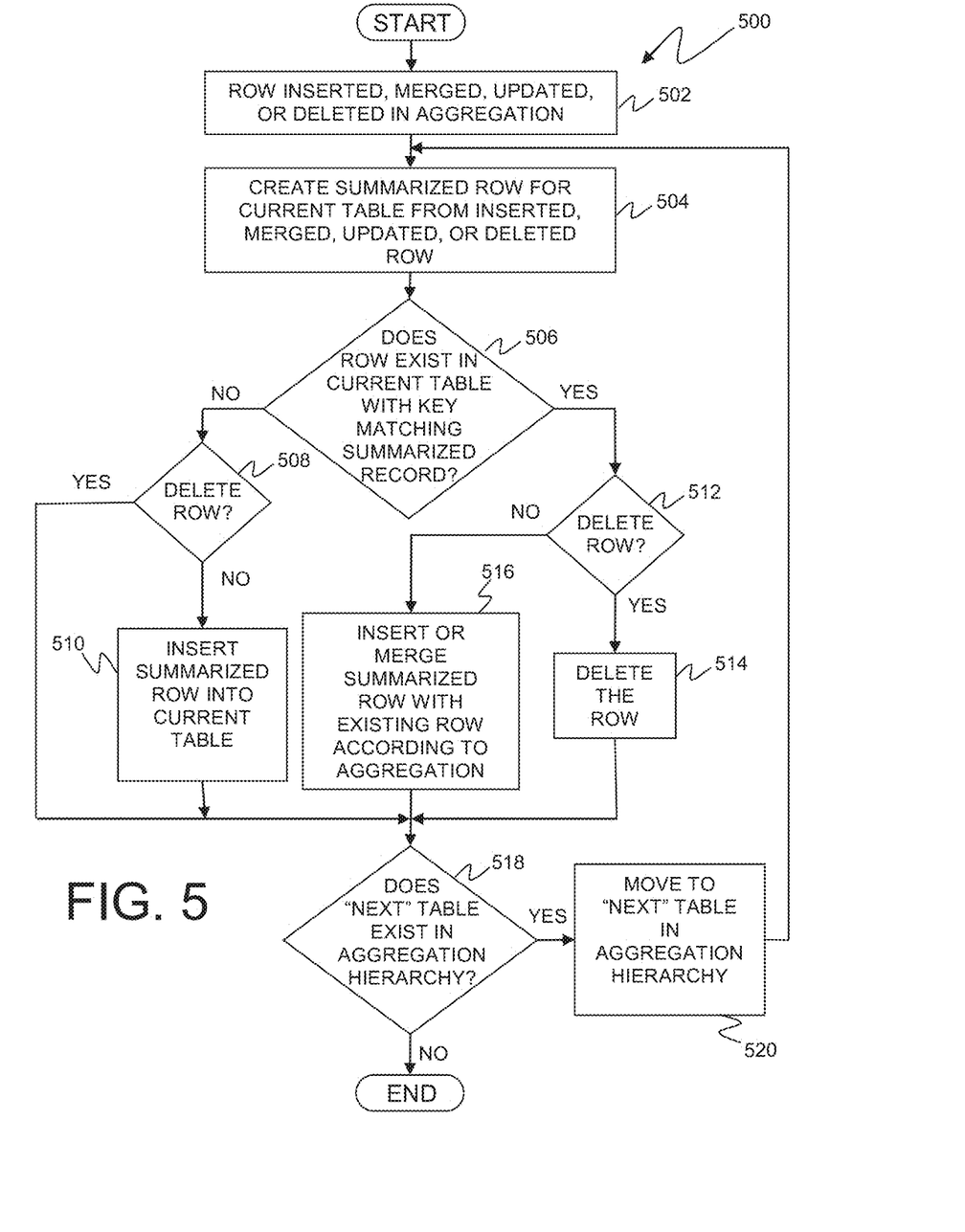
FIG. 5 is a flowchart depicting operational steps for automatically aggregating data in an aggregation object hierarchy when data is added to a table in the hierarchy, in an embodiment in accordance with the present invention.

FIG. 5 is a flowchart, generally depicted by the numeral 500, depicting operational steps for automatically aggregating data in an aggregation object hierarchy when data is added to a table in the hierarchy, in an embodiment in accordance with the present invention. Client application 122 on client computer system 114 via network 112 enters or updates data in relational database 110 using RDBMS software 104 and aggregation software 106 which receives the request to insert, merge, update, or delete a row in the aggregation object as depicted in step 502. In step 504, aggregation software 106 creates a summarized row with common key and data columns using the inserted, merged, updated, or deleted row and defined aggregation rules for the current table in the aggregation object hierarchy. Key columns in a relational database are non-repeating attributes that are used to uniquely specify the data within the table. There may be more than one key column. Some examples of common keys would be the date and time, or a unique ID, e.g., student ID or employee number, assigned to a person.

Aggregation software 106 then determines if the summarized row exists in the current table with keys matching the summarized record as indicated in decision 506. If the summarized row does not exist in current the table ("no" branch, decision 506), aggregation software 106 then checks to see if the aggregation operation is a delete request as indicated in decision 508. If the aggregation operation is a delete request ("yes" branch, decision 508), aggregation software 106 skips step 510. If the aggregation operation is not a delete request ("no" branch, decision 508), aggregation software 106 inserts the summarized row into the current table as depicted in step 508. If the summarized row does exist in the next table ("yes" branch, decision 506), aggregation software 106 then checks to see if the aggregation operation is a delete request as indicated in decision 512. If the aggregation operation is a delete request ("yes" branch, decision 512), aggregation software 106 deletes the row with the matching key column or columns in the current table as depicted in step 514. If the aggregation operation is not a delete request ("no" branch, decision 512), aggregation software 106 inserts or merges the summarized row with the existing row according to the aggregation specification as depicted in step 516. Aggregation software 106 then checks to see if there is a next table in the aggregation hierarchy as indicated in decision 518. If there is another table in the hierarchy ("yes" branch, decision 518), aggregation software 106 moves to the next table in the hierarchy as depicted in step 520 and steps 504 through 518 are repeated until the summarized row is added, updated, or deleted in all tables in the hierarchy. If there are no other tables in the hierarchy ("no" branch, decision 518), the process completes.

In some embodiments, a delete operation of a row in aggregation object hierarchy 200 may remove rows with matching key columns from all tables in the hierarchy. In other embodiments where tables in aggregation object hierarchy 200 may have been updated by the user or other applications, a delete operation will restore key and data columns of modified rows to their previous values. In another embodiment, aggregation software 106 may allow deleting operations on a selected number of tables in aggregation object hierarchy 200.

Figure 6:
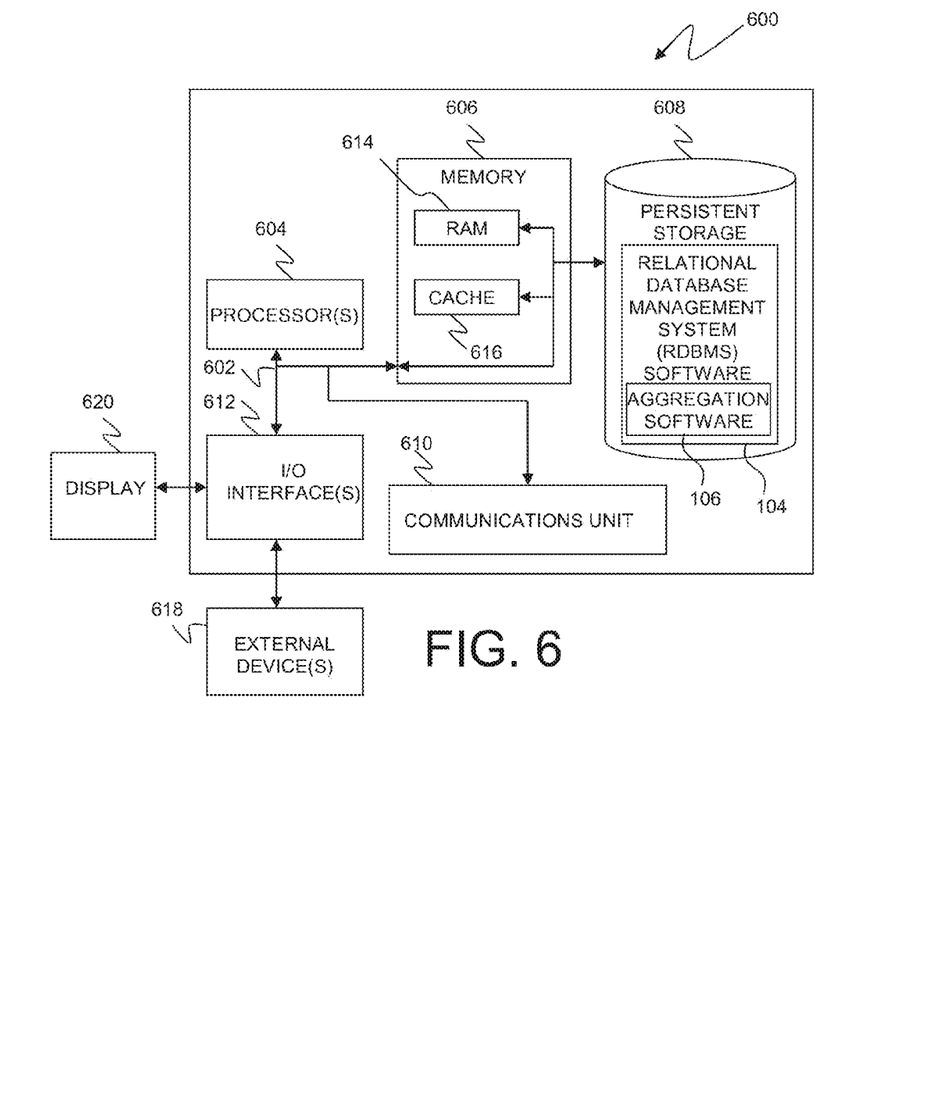
FIG. 6 depicts a block diagram of components of a relational data processing system in an embodiment in accordance with the present invention.

FIG. 6 depicts a block diagram, generally depicted by the numeral 600, of components of a relational data processing system in an embodiment in accordance with the present invention. It should be appreciated that FIG. 6 provides only an illustration of one implementation and does not imply any limitations with regard to the environments in which different embodiments may be implemented. Many modifications to the depicted environment may be made.

Server 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Relational database management system (RDBMS) software 104 and aggregation software 106 are stored in persistent storage 608 for execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of network 112 and client computer system 114. In these examples, communications unit 610 includes one or more network interface cards. Communications unit 610 may provide communications through the use of either or both physical and wireless communications links. RDBMS software 104 and aggregation software 106 may be downloaded to persistent storage 608 through communications unit 610.

I/O interface(s) 612 allows for input and output of data with other devices that may be connected to server 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., RDBMS software 104 and aggregation software 106, can be stored on such portable computer readable storage media and can be loaded onto persistent storage 408 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for aggregating data in database tables, the method comprising:
    creating, by one or more processors at a computer system, an aggregation object hierarchy comprising a set of tables with related key columns and data columns, wherein the aggregation object hierarchy is defined and managed as a single entity with a single definition, and a defined rule exists for each key column and each data column for each table in the set of tables;
    receiving, by one or more processors at a computer system, a request to update a table row in the aggregation object hierarchy, wherein the update to the table row is based on an updated table row from a table of the set of tables in the aggregation object hierarchy;
    creating, by one or more processors at a computer system, a summarized row from the updated table row, wherein the summarized row includes the key columns and one or more updated or inserted data columns from the updated table row;
    determining, by one or more processors at a computer system, the summarized row exists in one or more remaining tables of the aggregation object hierarchy;
    upon determining that the summarized row exists in one or more remaining tables of the aggregation object hierarchy, automatically aggregating, by one or more processors at a computer system, the one or more updated or inserted data columns of the summarized row to the one or more remaining tables in the aggregation object hierarchy, wherein the key columns and the one or more updated or inserted data columns of the summarized row are aggregated according to the defined rules that exist for each key column and each data column;
    receiving, by one or more processors at a computer system, a request to add a table row in the aggregation object hierarchy, wherein the addition of the table row is based on a new table row from a table of the set of tables in the aggregation object hierarchy;
    creating, by one or more processors at a computer system, a summarized row from the new table row, wherein the summarized row includes the key columns and one or more updated data columns from the new table row; and
    automatically aggregating, by one or more processors at a computer system, the summarized row to one or more remaining tables in the aggregation object hierarchy, wherein the key columns and the one or more updated data columns of the summarized row are aggregated according to the defined rules that exist for each key column and each data column, wherein the automatic aggregation of the summarized row to one or more remaining tables in the aggregation object hierarchy is performed based on defined table rules for each of the one or more remaining tables in the aggregation object hierarchy, wherein the defined table rules include removing a column from the summarized row, rounding a time value to an hour, summing values, and averaging values, and wherein the defined table rules are visible to the user as part of a column label.

2. The method of claim 1, wherein creating, by one or more processors at a computer system, an aggregation object hierarchy comprising a set of tables with related key columns and data columns further comprises:
    determining, by one or more processors at a computer system, a set of required database objects for the aggregation object hierarchy;
    generating, by one or more processors at a computer system, one or more names for the set of required database objects of the aggregation object hierarchy; and
    determining, by one or more processors at a computer system, if one or more required database objects already exist in the database and if the one or more required database objects can be reused.

3. The method of claim 2, further comprising:
    assigning, by one or more processors at a computer system, an existing set of database tables to form the aggregation object hierarchy;
    generating, by one or more processors at a computer system, a set of database tables required for the aggregation object hierarchy; and creating, by one or more processors at a computer system, the aggregation object hierarchy using the generated and existing set of database tables.

4. The method of claim 1, wherein creating, by one or more processors at a computer system, a summarized row from the updated table row further comprises:
  determining, by one or more processors at a computer system, a set of keys for the summarized row matching the tables in the aggregation object hierarchy; and
  generating, by one or more processors at a computer system, the summarized row using the set of keys.

5. The method of claim 1, further comprising:
  setting, by one or more processors at a computer system, upon a failure event for the aggregation object hierarchy create request, an operation completion code, wherein the operation completion code includes at least one of numbers and letters identifying a specific problem;
  creating, by one or more processors at a computer system, an error message wherein the error message includes the operation completion code; and
  transmitting, by one or more processors at a computer system, the error message to the user.

6. The method of claim 1, wherein the automatic aggregation of the summarized row to one or more remaining tables in the aggregation object hierarchy is further performed based on the location of the one or more remaining tables in the aggregation object hierarchy.

7. The method of claim 1, further comprising:
  breaking, by one or more processors at a computer system, the aggregation object hierarchy into the set of tables, wherein the aggregation object hierarchy and one or more associated automatic processes no longer exist, but the tables are retained.

8. The method of claim 1, further comprising:
  defining, by one or more processors at a computer system, aggregating actions for the tables of the aggregation object hierarchy, wherein the aggregating actions occur in all tables of the aggregation object hierarchy.

9. The method of claim 1, further comprising:
  defining, by one or more processors at a computer system, non-aggregating actions against a specific table in the aggregation object hierarchy, wherein the non-aggregating actions only occur in the specific table of the aggregation object hierarchy.

10. A computer program product for aggregating data in database tables, the computer program product comprising:
  one or more computer readable storage media and program instructions stored on the one or more computer readable storage media, the program instructions comprising:
  program instructions to create an aggregation object hierarchy comprising a set of tables with related key columns and data columns, wherein the aggregation object hierarchy is defined and managed as a single entity with a single definition, and a defined rule exists for each key column and each data column for each table in the set of tables;
  program instructions to receive a request to update a table row in the aggregation object hierarchy, wherein the update to the table row is based on an updated table row from a table of the set of tables in the aggregation object hierarchy;
  program instructions to create a summarized row from the updated table row, wherein the summarized row includes the key columns and one or more updated or inserted data columns from the updated table row;
  program instructions to determine the summarized row exists in one or more remaining tables of the aggregation object hierarchy;
  program instructions to, upon determining that the summarized row exists in one or more remaining tables of the aggregation object hierarchy, automatically aggregate the one or more updated or inserted data columns of the summarized row to the one or more remaining tables in the aggregation object hierarchy, wherein the key columns and the one or more updated or inserted data columns of the summarized row are aggregated according to the defined rules that exist for each key column and each data column;
  program instructions to receive a request to add a table row in the aggregation object hierarchy, wherein the addition of the table row is based on a new table row from a table of the set of tables in the aggregation object hierarchy;
  program instructions to create a summarized row from the new table row, wherein the summarized row includes the key columns and one or more updated data columns from the new table row; and
  program instructions to automatically aggregate the summarized row to one or more remaining tables in the aggregation object hierarchy, wherein the key columns and the one or more updated data columns of the summarized row are aggregated according to the defined rules that exist for each key column and each data column, wherein the automatic aggregation of the summarized row to one or more remaining tables in the aggregation object hierarchy is performed based on defined table rules for each of the one or more remaining tables in the aggregation object hierarchy, wherein the defined table rules include removing a column from the summarized row, rounding a time value to an hour, summing values, and averaging values, and wherein the defined table rules are visible to the user as part of a column label.

11. The computer program product of claim 10, wherein program instructions to create an aggregation object hierarchy comprising a set of tables with related key columns and data columns further comprises:
  program instructions to determine a set of required database objects for the aggregation object hierarchy;
  program instructions to generate one or more names for the set of required database objects of the aggregation object hierarchy; and
  program instructions to determine if one or more required database objects already exist in the database and if the one or more required database objects can be reused.

12. The computer program product of claim 11, further comprising:
  program instructions to assign an existing set of database tables to form the aggregation object hierarchy;
  program instructions to generate a set of database tables required for the aggregation object hierarchy; and
  program instructions to create the aggregation object hierarchy using the generated and existing set of database tables.

13. The computer program product of claim 10, wherein program instructions to create a summarized row from the updated table row further comprise:
  program instructions to determine a set of keys for the summarized row matching the tables in the aggregation object hierarchy; and
  program instructions to generate the summarized row using the set of keys.

14. The method of claim 10, further comprising:
program instructions to set, upon a failure event for the aggregation object hierarchy create request, an operation completion code, wherein the operation completion code includes at least one of numbers and letters identifying a specific problem;
program instructions to create an error message wherein the error message includes the operation completion code; and
program instructions to transmit the error message to the user.

15. A computer system for aggregating data in database tables, the computer system comprising:
one or more computer processors;
one or more computer readable storage media;
program instructions stored on the computer readable storage media for execution by at least one of the one or more processors, the program instructions comprising:
program instructions to create an aggregation object hierarchy comprising a set of tables with related key columns and data columns, wherein the aggregation object hierarchy is defined and managed as a single entity with a single definition, and a defined rule exists for each key column and each data column for each table in the set of tables;
program instructions to receive a request to update a table row in the aggregation object hierarchy, wherein the update to the table row is based on an updated table row from a table of the set of tables in the aggregation object hierarchy;
program instructions to create a summarized row from the updated table row, wherein the summarized row includes the key columns and one or more updated or inserted data columns from the updated table row;
program instructions to determine the summarized row exists in one or more remaining tables of the aggregation object hierarchy;
program instructions to, upon determining that the summarized row exists in one or more remaining tables of the aggregation object hierarchy, automatically aggregate the one or more updated or inserted data columns of the summarized row to the one or more remaining tables in the aggregation object hierarchy, wherein the key columns and the one or more updated or inserted data columns of the summarized row are aggregated according to the defined rules that exist for each key column and each data column;
program instructions to receive a request to add a table row in the aggregation object hierarchy, wherein the addition of the table row is based on a new table row from a table of the set of tables in the aggregation object hierarchy;
program instructions to create a summarized row from the new table row, wherein the summarized row includes the key columns and one or more updated data columns from the new table row; and
program instructions to automatically aggregate the summarized row to one or more remaining tables in the aggregation object hierarchy, wherein the key columns and the one or more updated data columns of the summarized row are aggregated according to the defined rules that exist for each key column and each data column, wherein the automatic aggregation of the summarized row to one or more remaining tables in the aggregation object hierarchy is performed based on defined table rules for each of the one or more remaining tables in the aggregation object hierarchy, wherein the defined table rules include removing a column from the summarized row, rounding a time value to an hour, summing values, and averaging values, and wherein the defined table rules are visible to the user as part of a column label.

16. The computer system of claim 15, wherein program instructions to create an aggregation object hierarchy comprising a set of tables with related key columns and data columns further comprise:
program instructions to determine a set of required database objects for the aggregation object hierarchy;
program instructions to generate one or more names for the set of required database objects of the aggregation object hierarchy; and
program instructions to determine if one or more required database objects already exist in the database and if the one or more required database objects can be reused.

17. The computer system of claim 16, further comprising:
program instructions to assign an existing set of database tables to form the aggregation object hierarchy;
program instructions to generate a set of database tables required for the aggregation object hierarchy;
program instructions to create the aggregation object hierarchy using the generated and existing set of database tables;
program instructions to set an operation completion code wherein the operational completion code may be numbers or letters identifying the specific problem;
program instructions to create the error message wherein the error message contains the operational completion code and may include other information pertaining to the failure event; and
program instructions to transmit the error message to the user.

18. The computer system of claim 15, wherein program instructions to create a summarized row from the updated table row further comprise:
program instructions to determine a set of keys for the summarized row matching the tables in the aggregation object hierarchy; and
program instructions to generate the summarized row using the set of keys.

* * * * *